Dec. 27, 1938.　　　E. H. BANCKER ET AL　　　2,141,896
PROTECTIVE ARRANGEMENT FOR ALTERNATING CURRENT SYSTEMS
Filed Oct. 23, 1935　　　3 Sheets-Sheet 1
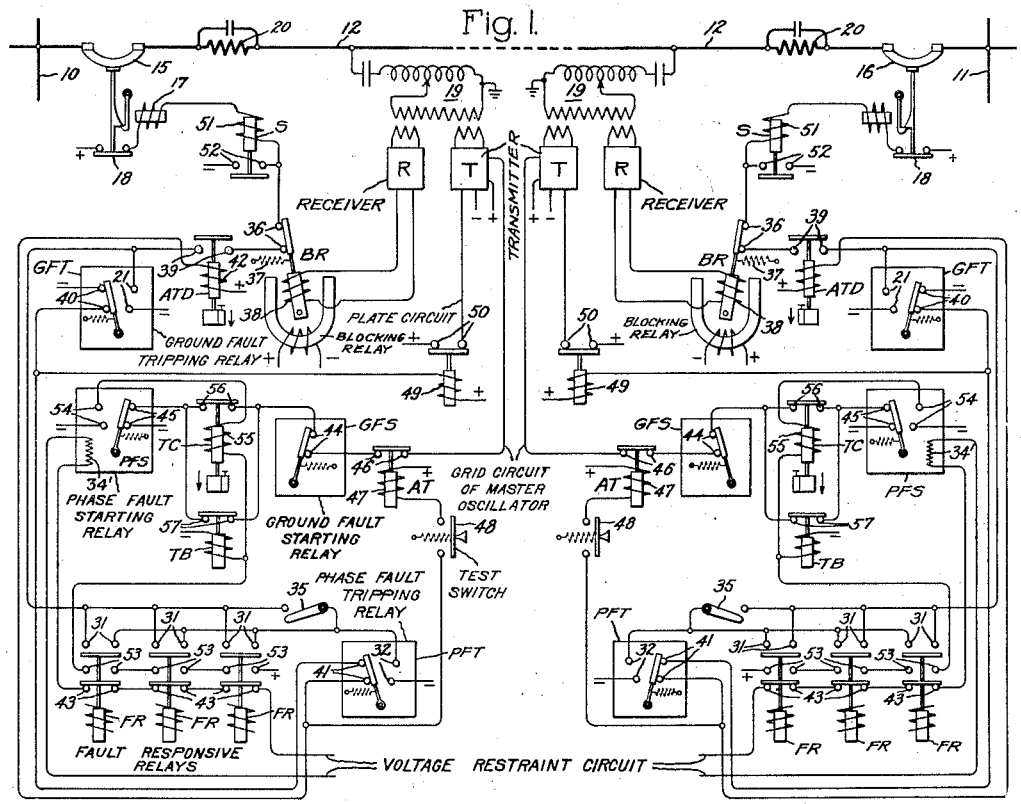
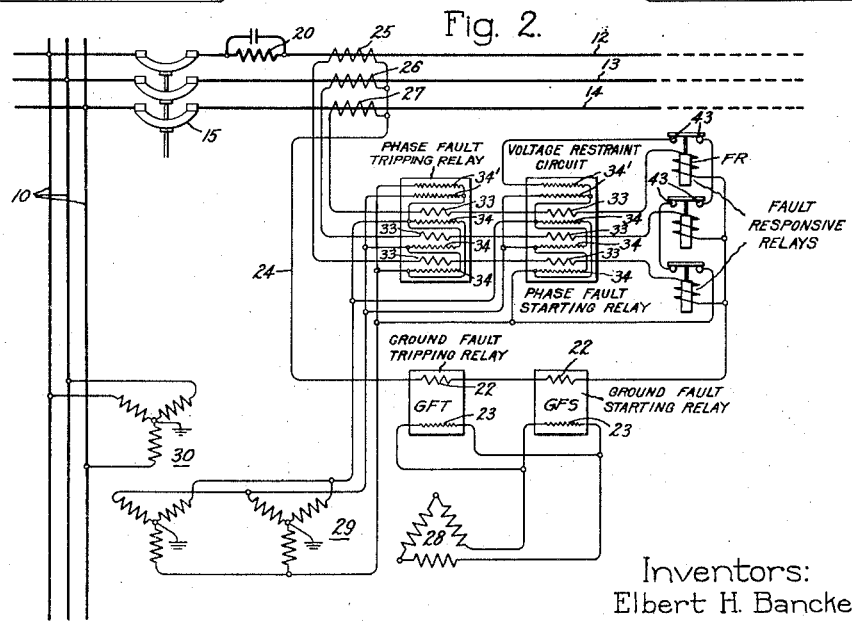
Inventors:
Elbert H. Bancker,
Theron A. Cramer,
by Harry E. Dunham
Their Attorney.

Dec. 27, 1938. E. H. BANCKER ET AL 2,141,896
PROTECTIVE ARRANGEMENT FOR ALTERNATING CURRENT SYSTEMS
Filed Oct. 23, 1935 3 Sheets-Sheet 2
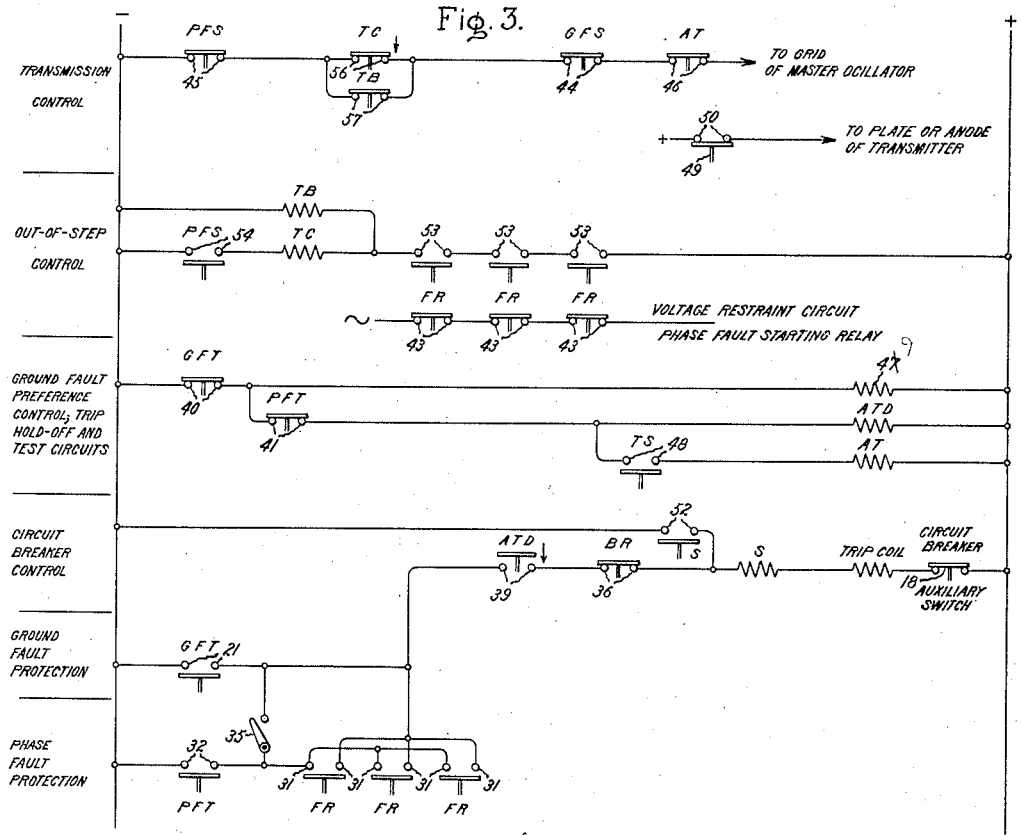
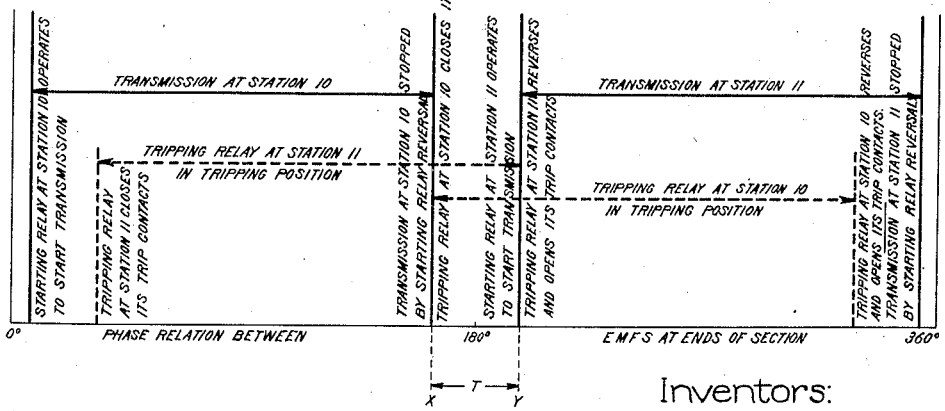
Inventors:
Elbert H. Bancker,
Theron A. Cramer,
by Harry E. Dunham
Their Attorney.

Dec. 27, 1938.  E. H. BANCKER ET AL  2,141,896
PROTECTIVE ARRANGEMENT FOR ALTERNATING CURRENT SYSTEMS
Filed Oct. 23, 1935   3 Sheets-Sheet 3
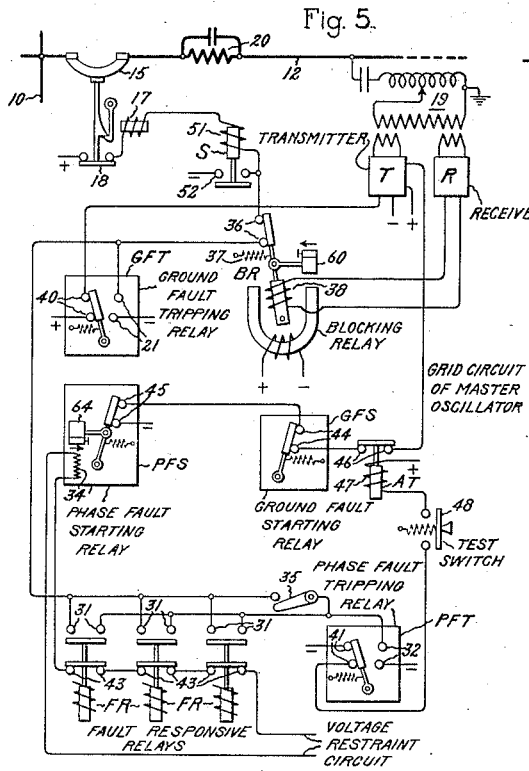
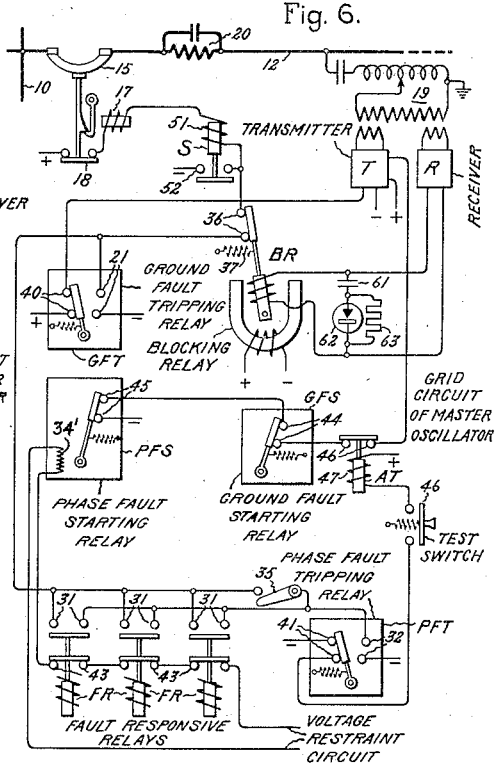
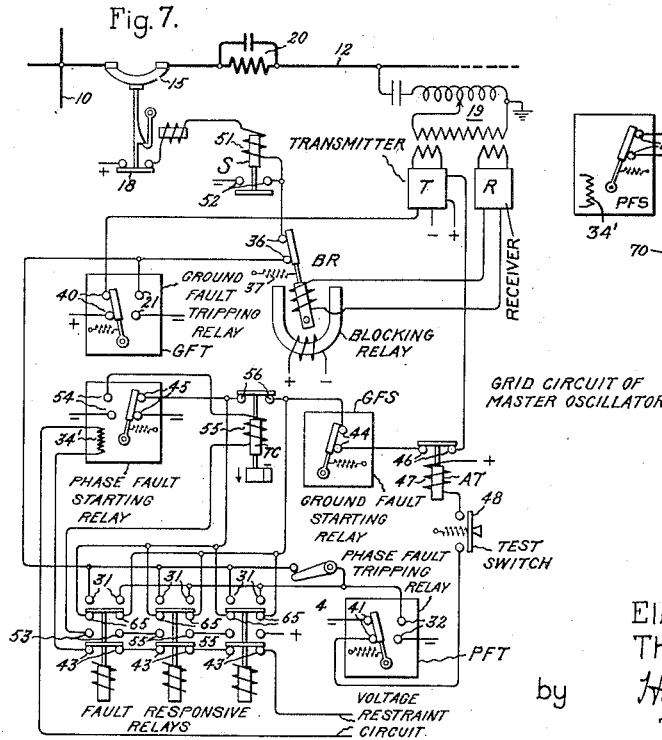
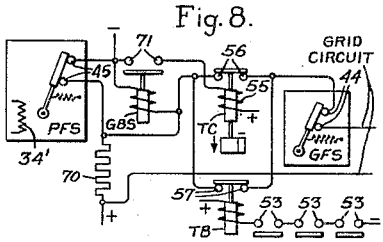
Inventors:
Elbert H. Bancker,
Theron A. Cramer,
by Harry E. Dunham
Their Attorney.

Patented Dec. 27, 1938

2,141,896

UNITED STATES PATENT OFFICE 2,141,896

PROTECTIVE ARRANGEMENT FOR ALTERNATING CURRENT SYSTEMS

Elbert H. Bancker and Theron A. Cramer, Schenectady, N. Y., assignors to General Electric Company, a corporation of New York Application October 23, 1935, Serial No. 46,290

19 Claims. (Cl. 175—294)

Our invention relates to improvements in protective arrangements for alternating current systems, and more particularly to improvements in protective arrangements of the type disclosed in United States Letters Patent 1,765,887 of Scott and Leben and 1,930,333 of E. H. Bancker. In such protective arrangements, fault responsive directional means are employed at the ends of a system section to effect tripping of the circuit breakers at the ends of the section on the occurrence of a fault within the section and to prevent tripping for a fault without the section. An object of our invention is to provide an improved protective arrangement whereby to prevent unnecessary tripping operation on the occurrence of asynchronous conditions of the system. Another object of our invention is to discontinue the preventive action when the asynchronous condition is accompanied by fault conditions which require circuit interruption. These and other objects of our invention will appear in more detail hereinafter.

In the event of a transfer of power other than in the normal functioning of an alternating current system and on the occurrence of faults, there is a tendency to incorrect operation of such protective devices as are dependent on the direction of energy transfer or reactive kva. transfer or both for their selective operation.

Thus under asynchronous conditions of an alternating current system, there is, during one-half of a slip cycle, a flow of energy or kilowatts from one end of a section to the other. During the other half of the slip cycle, the energy flow or kilowatts is reversed. Energy directional relays at the ends of the section responding to true watts would tend to reverse simultaneously because, except for line losses, they would have zero torque at the same instant. Such relays, however, would not respond properly to faults. Fault responsive energy directional relays must respond to a function of both the real energy and the reactive kva., which are fed to a fault. Such relays at the ends of a section do not have zero torque at the same time and therefore would not reverse simultaneously, but they do respond to asynchronous conditions because such conditions present the appearance of an internal fault for a part of the slip cycle. The internal fault indication lasts longer in those sections whose terminal voltages become displaced 180°, than in those where the displacement is always less than 90°. In the latter case, the stations at the ends of the section are said to be on the same side of the electrical center and in the former case on opposite sides of the electrical center. The relays would, accordingly, trip the circuit breakers at the ends and thus unnecessarily interrupt the section. Such action may occur at several different places in a system at the same time and thus seriously disrupt service.

In order to avoid this, we provide, in accordance with our invention, means for continuing the tripping preventive action over the interval between the times at which the torques of the energy directional relays at the terminals of a section reverse or pass through their zero values. This continuation of the tripping preventive action is permitted preferably only when there is a power swing as distinguished from a fault. Where the blocking action which prevents tripping on external faults is accomplished by a current transmitted from one end of the section to the other, whether by space transmission, superposition on the power line itself, auxiliary pilot conductor or other suitable transmitting channel, we may continue the current transmission over the troublesome interval. On the other hand, the desired result may be obtained by incorporating the time action directly in the devices themselves, as will appear in more detail hereinafter. Further in accordance with our invention, we provide means for subsequently rendering the preventive action ineffective in the event of an internal fault while asynchronous conditions also prevail since tripping obviously should be effected under such conditions.

Our invention will be better understood from the following description, when considered in connection with the accompanying three sheets of drawings, and its scope will be pointed out in the appended claims.

In the accompanying drawings, Fig. 1 illustrates diagrammatically an embodiment of our invention as applied to a section of an alternating current system; Fig. 2 diagrammatically illustrates the alternating current connections of the fault responsive relays at one end of the section; Fig. 3 is an elementary diagram of the protective arrangement shown in Fig. 1; Fig. 4 is an explanatory time-sequence diagram illustrating operation during asynchronous conditions; Figs. 5 and 6 diagrammatically illustrate modifications of my invention, the apparatus at only one end of a section being illustrated for simplicity since similar apparatus is installed at the other end; Fig. 7 diagrammatically illustrates a modification of the embodiment of my invention shown in Fig. 1, the equipment at only one end of a section being illustrated for the sake of simplicity; and Fig. 8 diagrammatically illustrates a modification of a part of the embodiment of our invention shown in Fig. 1.

In the embodiment of our invention illustrated in Figs. 1, 2, and 3, a section of a polyphase system is represented as extending between two stations shown schematically as buses 10 and 11, which are connected by a polyphase line 12, 13, and 14. Only one conductor 12 is shown in Fig. 1, for simplicity. The line is shown broken to give a concept of distance. At the ends of the section there are shown suitable circuit controlling means, such as circuit interrupters 15 and 16, which are illustrated as latched-in circuit breakers having trip coils 17 and auxiliary switches 18. The latter are closed when the circuit breakers are closed and are used in the trip coil circuits for the purpose of saving the more delicate relay contacts from the inductive discharge of the trip coil when its circuit is opened. For controlling the circuit interrupting means selectively in accordance with the location of a fault within or without the section, there are at each end of the section suitable fault responsive means for effecting the opening of the circuit breakers by energizing the respective trip coils for example and for selectively controlling the transmission channel.

In the illustrated embodiments of our invention, one of the system conductors 12 with ground return forms the transmission channel on which there may be superposed, at each end of the line section, alternating current of a frequency differing from the frequency of the system power current. For this purpose and for preventing the opening of the circuit breakers under predetermined conditions, there may be used any suitable transmitting means T and receiving means R, examples of which are well known in the art, transmitting and receiving means of the electric discharge valve type being disclosed, for example, in Patent 1,930,333. For this reason, we have merely indicated the transmitters and receivers schematically together with the associated coupling and tuning means 19. For simplicity and economy, the transmitters T at each end of the section are tuned to the same frequency and the receivers R are tuned to this frequency and so connected that transmission by either transmitter will energize both receivers. In order to confine the superposed transmitted current to the line section in question, the line section conductor to which the transmitters are coupled is provided with suitable trap circuits 20. By using adequate power in the transmitter and a relatively insensitive receiver, it is possible to obtain freedom from interference which might otherwise be caused by static and arcing grounds.

For energizing an auxiliary circuit such as the circuit of the trip coil 17 on the occurrence of ground faults, there may be provided a ground fault tripping relay GFT whose contacts 21 are arranged in series in the circuit of the trip coil 17. This relay is responsive to ground faults and is preferably of the directional type, so connected and arranged as to close its trip contacts 21 on the occurrence of energy flow from the station to the section and thence to ground. As illustrated in Fig. 2, this relay has a current coil 22 which is connected to be energized in accordance with the residual current of the section at the station where the relay is located and a voltage coil 23 which is connected to be energized in accordance with the residual voltage at the station in any suitable manner, examples of which are well known to the art. In the arrangement shown in Fig. 2, the residual current is derived from the neutral lead 24 of the current transformers 25, 26, and 27, and the residual voltage is obtained from the delta winding 28 of a potential transformer 29, which is energized from a potential transformer 30 connected to the bus 10.

For energizing the circuit of the trip coil on the occurrence of interphase faults, that is to say, faults involving two or more phase conductors, there may be provided one or more fault responsive relays FR, whose contacts 31 are in parallel with each other and in series with the trip coil circuit, and a phase fault tripping relay PFT whose contacts 32 are in series with the parallel connected contacts 31 of the fault responsive relays FR. The phase fault tripping relay is preferably of the directional type, so connected and arranged as to tend to close its contacts 32 on the occurrence of flow of energy from the bus into the section. As shown in Fig. 2, this relay may have current coils 33 respectively connected to be energized in accordance with the currents in the different phase conductors and potential coils 34, the voltages on which may be derived from a potential transformer 30 and are preferably in quadrature relation with the currents in the associated current coils at unity power factor in all phases. The phase fault tripping relay is preferably such that it does not function merely on magnitude of energy flow but only on the basis of fault energy flow. For this purpose, it is provided with a restraining feature which prevents operation of the relay until there is a voltage decrease indicative of fault conditions to which the relay should respond. Such a relay is disclosed in United States Letters Patent 1,883,839 of R. L. Webb. In Fig. 2, the restraint feature is indicated by two cooperating potential windings 34' whose torque is opposed to the energy directional torque which tends to close the trip contacts 32. The fault responsive relays FR may be of any suitable type operative on the occurrence of a fault. Thus they may be straight overcurrent relays connected to be energized in accordance with the currents in the respective phase conductors, as shown in Fig. 2, or, as will be obvious to those skilled in the art, they may be any other relays which respond, for example, to under-voltage, or to a combination of overcurrent and under-voltage. So far as the direct control of the trip circuit by these fault responsive relays is concerned, their contacts 31 in series in the trip circuit may be either omitted entirely or by-passed at any time by suitable means such as the switch 35.

In the event of a fault outside the section between the stations 10 and 11, whether a ground fault or an interphase fault, which would tend to operate the tripping relays at the station where power flow is from the bus into the section as well as the fault responsive relays FR, there are provided means for selectively blocking the trip circuit after the manner disclosed in Patent 1,-765,887. As shown, this means includes at each station a blocking relay BR whose contacts 36 are connected in series in the trip coil circuit and normally held closed by any suitable biasing means, indicated as a spring 37. The blocking means is so connected and arranged under fault conditions causing a through flow of energy in the line section 12, that current will be transmitted by the transmitter at the end of the section from which energy flows outwardly to energize the receiver at the end of the section into which energy is being fed. This effects the energization of the blocking relay at the latter end and causes it to open its contacts 36 whereby to prevent tripping of the circuit breaker. For this purpose, the blocking relay may be of the sensitive polarized type illustrated, with an actuating coil 38 which is connected to be energized from the local receiver upon energization thereof.

Inasmuch as there is an appreciable time element involved in the reception of the current at one station from the transmitter at the other and in the operation of the blocking relay, it is necessary to insure that the blocking relay opens its contact 36 before the tripping relays can close their contacts to complete the trip circuit. For this purpose, there may be employed, after the general manner disclosed in Fitzgerald Reissue Patent 19,034, means for keeping the trip circuit open the necessary time. As illustrated, this is an auxiliary tripping delay drop-out relay ATD which is normally energized and has its contacts 39 in the trip circuit. The time delay drop-out of this relay is of course relatively short, for example about 0.03 second. Instead of providing the necessary time delay by a separate device, it may be incorporated directly in the tripping relays themselves. Inasmuch as the auxiliary tripping delay relay should be deenergized in response to fault conditions, its circuit may be controlled by the phase and ground fault tripping relays, as shown, so as to be opened on the occurrence of energy flow from the bus into the section. Thus, the normally closed back contacts 40 of the ground fault tripping relay and the normally closed back contacts 41 of the phase fault tripping relay may be arranged in series with the energizing winding 42 of the auxiliary tripping delay relay.

In order to insure operation of the transmitter at the station where the energy flow is from the section to the bus, there are provided energy directional responsive means for starting the transmitters in response to ground and interphase faults. While back contacts on the tripping relays may be used for this purpose, there are preferably provided a separate ground fault starting relay GFS and a separate phase fault starting relays PFS. The ground fault starting relay is essentially the same and connected in the same manner as the ground fault tripping relay, as will be obvious from Fig. 2. The phase fault starting relay PFS may also be of the type disclosed in Patent 1,883,839, and is connected and functions in the manner disclosed in Patent 1,930,333. As shown, the phase fault starting relay is of the polyphase directional type similar to and connected in the same manner as the phase fault tripping relay, in that it has the restraining feature for preventing operation merely on magnitude of energy flow unless there is a corresponding voltage decrease indicative of fault conditions to which the relay should respond. To carry out this idea further, the voltage restraint circuit may be placed under the control of the contacts 43 of the fault responsive relays FR connected in series relation so that on the occurrence of a fault causing the operation of any one of these relays, the voltage restraint feature is removed.

The control of the transmitters by the phase and ground fault starting relays is accomplished as illustrated by having the contacts 44 of the ground fault starting relay and the contacts 45 of the phase fault starting relay normally closed and connected in series relation with the grid circuit of the master oscillator of the transmitter so as normally to maintain thereon a negative bias sufficient to block the transmitter. When either of these relays operates to open its normally closed contacts in response to energy flow from the section into the bus, the transmitter at the associated station is set into operation.

For testing purposes, the grid biasing circuit may be further controlled by the normally closed contacts 46 of a testing relay AT whose energizing circuit 47 is under the control of a test switch 48. In order that any attempt to test during the existence of fault conditions for which the transmitter should not be operated will not interrupt the proper sequential functioning of the several devices, the circuit 47 is also under the control of the normally closed back contacts 41 of the phase fault tripping relay and the normally closed contacts 40 of the ground fault tripping relay in series.

In order to insure tripping on an internal ground fault with a heavy through load in the opposite direction to the flow of ground fault energy, the interphase fault starting relay PFS may be so interlocked with the ground fault tripping relay GFT as to give this relay preferential control. For this purpose, the ground fault tripping relay can be so arranged to control the transmitter that even though with a heavy through load from the section to the bus, the phase fault starting relay PFS should open its contacts 45 and thus remove the negative bias from the master oscillator valve to start transmission, the ground fault tripping relay GFT with ground energy flow from the bus into the section would operate to prevent transmission. This may be accomplished by having the back contacts 40 of the ground fault tripping relay control an auxiliary relay 49, whose normally closed contacts 50 are in the anode circuit of the transmitter.

As is well known to the art, relays of the type illustrated for the ground and phase fault tripping and the fault responsive relays usually have a self-contained seal-in arrangement for holding their contacts closed after operation, so as to maintain positive contact closure. For simplicity in illustration, this self-contained seal-in feature is not shown. The seal-in feature may be embodied in a separate seal-in relay S, whose coil 51 is connected in the trip circuit so that upon completion thereof the relay S closes its contacts 52 to continue its own circuit as well as that of the trip coil 17. Sometimes as a matter of extra precaution, both the self-contained seal-in of the tripping and fault responsive relays and the separate seal-in of another auxiliary relay S may be used.

Assuming now a ground fault on the system external to the section between the stations 10 and 11, for example, to the right of station 11, then since there will be a flow of ground fault energy from station 10 into the section, the ground fault tripping relay at station 10 will operate to open its contacts 40 and to close its contacts 21, thereby opening the circuit of the auxiliary tripping delay relay ATD and completing contacts in the trip circuit, but the ground fault starting relay at station 10 will not operate to open its contacts 44. At station 11, the direction of ground fault energy flow is from the section to the bus. Accordingly, at this station the ground fault tripping relay does not operate but the ground fault starting relay does. Consequently, the transmitter at station 11 is started upon the opening of the contacts 44 of the ground fault starting relay as this takes the negative bias off the master oscillator grid. Transmission at station 11 energizes the receiver at each station to effect the operation of the blocking relay at the respective station. The blocking relay at station 10, accordingly, opens its contacts 36 before the auxiliary tripping delay relay can close its contacts 39 and therefore no tripping takes place at station 10. The circuit breaker at station 11 will of course not be tripped because the contacts 21 of the ground fault tripping relay are open as well as the contacts 36 of the blocking relay and the contacts 39 of the auxiliary tripping delay relay. If, however, the ground fault were internal, that is, between stations 10 and 11, then the tripping relay at station 11 would open its contacts 40 to deenergize the auxiliary tripping delay relay ATD and would close its contacts 21 in the trip circuit. The ground fault starting relay at this station would not operate and since the ground fault starting relay at station 10 is not operated, neither transmitter can transmit to effect a blocking operation of the blocking relay at either station. Accordingly, upon the expiration of the time delay of the auxiliary tripping delay relays at each station, the circuit breaker at the station will be tripped.

Assuming now a fault involving two phase conductors external to the section between stations 10 and 11, for example, to the right of station 11, then since at station 10 the direction of energy flow is from the bus into the section, the phase fault tripping relay at this station will operate to open its contacts 41 in the circuit of the auxiliary tripping delay relay, thereby deenergizing this relay, and to close its contacts 32 in the circuit of the trip coil. If fault responsive relays FR are used with their contacts in series with the contacts 32 of the phase fault tripping relay, then one or more of these relays will also have responded to close its contacts 31. At station 10, the phase fault starting relay will not operate because of the direction of flow of energy from the bus into the section. However, at station 11 the direction of flow of energy is from the section into the bus and accordingly the phase fault tripping relay maintains its contacts 41 closed to keep the auxiliary tripping delay relay ATD energized, but the phase fault starting relay at station 11 operates quickly to open its contacts 45 because its voltage restraint is removed upon the operation of any one of the fault responsive relays FR opening its series connected contacts 43. The opening of the contacts 45 removes the bias from the grid circuit of the master oscillator and the closing of the contacts 54 does nothing unless all of the fault responsive relays FR are simultaneously energized. The operation of the transmitter at station 11 energizes not only the receiver at this station but also the receiver at station 10, thereby affecting the energization of the blocking relay at this station as well as at station 11. The blocking relay at station 10 operates to open its contacts 36 before the auxiliary tripping relay ATD can close its contacts 39, thereby preventing the closure of the trip coil circuit at station 10. In the event of a fault between stations 10 and 11, then the phase fault tripping relay at each station operates because the fault power is from each bus into the section. The phase fault starting relays do not operate, and accordingly each transmitter is held inoperative, and upon the expiration of the time delay of the auxiliary tripping delay relays which are deenergized upon operation of the phase fault tripping relays, the closure of the trip circuits at the respective stations is effected.

In the event of a ground fault on the section during a heavy through flow of energy in the section, the ground fault tripping relay at one station at least operates to prevent transmission either by effecting the opening of the plate circuit of the transmitter or by applying a bias to the transmitter grid, thereby preventing transmission from its own station independently of any operation of the phase fault starting relays. Consequently, no transmission can occur to effect a blocking operation to prevent tripping even though the phase fault starting relays tend to remove the bias on the grid circuit.

Reference will now be had to Fig. 4 in addition to Fig. 1 to explain why, with asynchronous conditions on the system, undesirable tripping can occur at either one or both of the stations 10 and 11. In Fig. 4, it is assumed that there is an electrical center within the section, that is, between the stations 10 and 11. During the phase displacement range or interval of the E. M. F.'s at stations 10 and 11 between zero and X, X being something less than 180°, the section presents the appearance of a balanced external fault to the left of station 10 and energy flow is from station 11 to station 10. During the phase displacement range X to Y, Y being something greater than 180°, the section presents the appearance of a balanced internal fault. During the phase displacement range from Y to 360°, the section presents the appearance of a balanced external fault to the right of station 11 and energy flow is from station 10 to station 11. Thus during a slip cycle, that is a 360° range of phase displacement between the E. M. F.'s of the synchronous apparatus connected to the system on opposite sides of the section, the section appears to have first a fault external to one end, then an internal fault and finally a fault external to the other end.

Consequently, the phase fault starting relay at station 10 and the phase fault tripping relay at station 11, because of their voltage restraint feature, operate sometime after the inphase condition. Inasmuch as asynchronous conditions also present all the elements of a balanced polyphase fault, all the fault responsive relays FR tend to operate. The phase fault tripping and starting relays may both be arranged to have maximum torque at the same phase angle between current and voltage, but since the phase fault starting relay at one station must effect transmission before the phase fault tripping relay at the other station can trip, the voltage restraint of the phase fault tripping relay at one station is made enough greater than that of the starting relay at the other station to insure advance action of the latter. The fault responsive relays FR, although they tend to assist tripping if arranged with contacts in the tripping circuit, also temporarily remove the voltage restraint on the starting relays so that the directional torque thereof has sole control. Thus, for the out-of-phase relation between zero and 180° with power flow from station 11 to station 10, the phase fault starting relay at station 10 effects the transmission of carrier at this station prior to the tripping operation of the phase fault tripping relay at station 11 so that no tripping can occur at station 11. Before the E. M. F.'s at the stations reach the 180° phase displacement condition, the current at station 10 is so leading with respect to the voltage there as to effect the reversal of the phase fault starting relay at station 10 and also the reversal of the phase fault tripping relay at station 10. If these relays are set to have maximum torque at the same angle of lag, then the directional torques of both relays reverse at the same instant. However, because of its greater restraint, the phase fault tripping relay at station 10 may reverse somewhat later than the starting relay at this station. As the E. M. F.'s at stations 10 and 11 pass through the 180° phase displacement relation, true power flow is from station 10 to station 11. Sometime after the 180° phase displacement condition, the phase fault starting relay at station 11 has a reversal of its directional torque and starts the transmitter at station 11. At substantially the same time, the tripping relay at station 11 has a torque reversal. As the inphase position is approached, the fault responsive relays drop out and, due to the increasing restraint torque overcoming the directional torque of the tripping relay at station 10 and the starting relay at station 11, these relays return to their normal positions.

From the foregoing and Fig. 4, it will be obvious that there is a time interval T between two phase displacements X and Y on opposite sides of the 180° phase displacement position during which the section presents the appearance of an internal fault and also during which there would be no blocking action to prevent tripping not only at one station but also at the other. Consequently tripping may occur because during this interval of time the phase fault tripping relays at both stations are in tripping position.

In accordance with our invention, we provide means for so spanning this interval that undesirable tripping cannot occur. As shown in Fig. 1, this means is such as to continue transmission of blocking current during the X—Y phase displacement interval. Since it is desirable to continue the preventive action of the blocking relay BR only in case of asynchronous conditions, we may arrange to have this continuing action occur only at times of balanced phase conditions. For the purpose of continuing the blocking current to continue the preventive action of the blocking relay BR, we provide, as shown in Fig. 1, a transmission continuing relay TC whose energization is effected only in response to the operation of the phase fault starting relay PFS on energy flow from the section to the bus and all of the fault responsive relays FR. For this purpose the contacts 53 of the fault responsive relays FR and the contacts 54 of the phase fault starting relay are arranged in series in the energizing circuit of the winding 55 of the transmission continuing relay. The means by which this relay continues transmission of the blocking current is immaterial, but, as shown, it is an instantaneous opening time delay closing relay whose normally closed contacts 56 are in the negative grid bias circuit of the transmitter. Thus, whenever the transmitter has been started and the phase fault starting relay tends to stop it during an abnormal but balanced condition of the circuit, the operation of the transmitter will be continued because the transmission continuing relay keeps negative bias from the transmitter for a time T, the reason for which was explained in connection with Fig. 4, after the phase fault starting relay tends to reapply it. This time may vary with different systems and is dependent on the slowest slip cycle to be expected. Consequently, even though the phase fault starting relay returns to its grid bias establishing contacts 45, the grid bias is not applied because the grid circuit is still open at the contacts 56 of the transmission continuing relay.

Inasmuch as it is possible to have a fault occur on the section during asynchronous conditions, it is preferable not to continue the transmission of blocking current under these conditions. In accordance with our invention, we provide means for rendering the transmission continuing means ineffective to continue the preventive action on the occurrence of a fault on the section causing unbalance between the phases during asynchronous conditions. As shown in Fig. 1, this means includes a transmission blocking relay TB, whose contacts 57 are arranged in series in the negative bias circuit of the transmitter grid and in parallel with the contacts 56 of the transmission continuing relay and whose energization is controlled conjointly by the action of all of the fault responsive relays FR. Thus, even though the transmitter continuing relay is in position to continue transmission, the transmission can be stopped by the transmission blocking relay TB in the event that any one of the fault responsive relays FR has its contacts 53 open and power flow is from the station bus into the section so that the contacts 45 of the phase fault starting relay and the contacts 44 of the ground fault starting relay are closed.

In case of an internal ground fault during asynchronous conditions, the transmitter is immediately blocked because of the preferential control given the ground tripping relay. In the rather unusual case of an internal fault involving all phases and starting during asynchronous conditions, tripping is delayed until the transmission continuing relay recloses its contacts 56.

If the phase fault starting relay PFS has only the single throw contacts 45, the control of the transmission continuing TC and transmission blocking TB relays and through them the bias on the transmitter grid circuit may be accomplished, as shown in Fig. 8, by arranging to have the contacts 45 control a substantially instantaneous grid bias shifting relay GBS. For this purpose, the relay GBS may be arranged to have its winding circuit of high resistance in comparison with the resistance 70 and to be short-circuited through the contacts 45 of the relay PFS so that, when the contacts 45 are closed a relatively high negative bias is applied to the grid, but, when open, the bias is decreased to a point where the transmitter can operate. When the relay GBS closes its contacts 71 in response to the operation of the relay PFS, the transmission continuing relay TC is energized to open its contacts 56 and will remain energized until such time as the relay PFS recloses its contacts 45 to drop out the relay GBS. Thus, transmission will be continued after the contacts 45 are closed for the time required by the relay TC to drop out and reclose its contacts 56 if during this time the contacts of the transmission blocking relay are open, which would be the case in the event of asynchronous conditions effecting the operation of all of the fault responsive relays FR to close their contacts 53. However, in the event of an unbalanced internal fault during asynchronous conditions, the phase fault starting relay will alternately open and close its contacts 45 and the transmission continuing relay will have its contacts 56 open if the contact alternations of the PFS relay are faster than the time delay dropout of the TC relay but the transmission blocking relay will have its contacts 57 closed for a short time around the in-phase condition. During this time the transmitter is turned off, thus allowing the blocking relays to close their contacts in the trip circuit so that tripping can occur.

In the embodiments of our invention shown in Figs. 5, 6, and 7, no auxiliary tripping delay relay is shown as it is presumed that in the arrangements therein shown, such time delay is embodied in the tripping relays as to permit reception of the transmitted current and operation of the blocking relay BR before tripping can occur.

In the arrangement shown in Figs. 5 and 6, instead of continuing the transmitted current to prevent false tripping during the interval T discussed in connection with Fig. 4, we may provide the blocking relay with means for delaying its circuit reclosure once it has been energized by its associated receiver through transmission from either end. Any suitable means may be employed, but we have indicated in Fig. 5 a time delay device such as a dashpot 60 which delays closure of the contacts 36 of the blocking relay BR once they have been opened.

Instead of incorporating the time delay of contact reclosure of the blocking relay mechanically as shown in Fig. 5, it may be arranged electrically as shown in Fig. 6. For this purpose, there may be connected across the operating winding 38 of the blocking relay BR a condenser 61 connected in series with a one-way rectifier 62 across which is connected a resistance 63. In this manner the charging of the condenser during the energization of the winding 38 does not materially retard the opening of the relay contacts and the discharge of the condenser when the receiver is deenergized will be sufficiently fast to hold the relay in the circuit opening position long enough to span the time T. If a copper oxide rectifier is used, the resistance of this in its non-rectifying direction will ordinarily be sufficient without an additional resistor 63.

Also as shown in Fig. 5, the necessary time delay to maintain transmission may be incorporated in the phase fault starting relay by delaying the closure of its blocking contacts 45 once they have been opened to start transmission. Here again the delay is indicated as a dashpot device 64.

In the embodiment of our invention shown in Fig. 7, the continuation of transmission over the time T is effected in the same manner as shown in Fig. 1 by the transmission continuing relay TC. However, instead of restoring the grid bias by the transmission blocking relay which is controlled by the action of the fault responsive relays, the contacts 56 of the transmission continuing relay are parallelled directly by normally closed contacts 65 on the fault responsive relays FR. We have found, however, that this arrangement will not permit tripping with as high a slip frequency as the arrangement shown in Fig. 1 because the bias is not restored as quickly as with the arrangement shown in Fig. 1. In other words, for an internal fault on the section while it is asynchronous, the interval during which tripping can occur will not be as great as with the arrangement shown in Fig. 1, because with the arrangement shown in Fig. 1 the time to stop transmission of blocking current is merely that required for one of the fault responsive relays to part its contacts and for the substantially instantaneous transmission blocking relay to drop out, whereas with the arrangement shown in Fig. 7, the transmission of blocking current can occur during the remainder of the pick-up time of one of the fault responsive relays after it has parted its contacts and all of the dropout time of one of these relays. While the difference between the times of contact operation outlined for the arrangements shown in Figs. 1 and 7 may seem relatively small, it is in fact large when compared with the tripping time of about 0.05 second or less.

While we have shown and described our invention in considerable detail, we do not desire to be limited to the exact arrangements shown, but seek to cover in the appended claims all those modifications that fall within the true spirit and scope of our invention.

What we claim as new and desire to secure by Letters Patent of the United States, is:

1. In combination, an alternating current circuit, means for interrupting the circuit at each of two points thereof, means for transmitting a control current from each of said points to the other, directional fault responsive means at said points connected to be energized from the circuit for controlling the associated circuit interrupting means to effect the opening thereof on the occurrence of predetermined circuit conditions and for controlling said transmitting means in accordance with the directions of energy flow at said points, means connected to be controlled by said transmitted current for preventing the directional responsive means at the respective points from effecting the opening of the associated circuit interrupting means, and means for continuing under asynchronous conditions of the circuit transmission of current by the transmitting means at one or the other of said points for a predetermined time after the directional fault responsive means controlling said transmitting means ceases to effect the operation thereof.

2. In combination, an alternating current circuit, means for interrupting said circuit at each of two points thereof, means for transmitting a control current from each of said points to the other, directional fault responsive means at said points connected to be energized from the circuit for controlling the associated circuit interrupting means to effect the opening thereof on the occurrence of predetermined circuit conditions and for controlling said transmitting means in accordance with the directions of energy flow at said points. means connected to be controlled by said transmitted current for preventing the directional responsive means at the respective points from effecting the opening of the associated circuit interrupting means, means for continuing under asynchronous conditions of the circuit transmission of current by the transmitting means at one or the other of said points for a predetermined time after the directional fault responsive means controlling said transmitting means ceases to effect the operation thereof, and means for rendering said continuing means ineffective to continue said transmission on the occurrence of a fault on the circuit between said points causing unbalance between the phases of the circuit during asynchronous conditions thereof.

3. In combination, an alternating current circuit, means for transmitting a control current from each of two points of said circuit to the other, an auxiliary circuit at each of said points, directional fault responsive means at each of said points for controlling the energization of the auxiliary circuits at the respective points on the occurrence of predetermined conditions of said alternating current circuit and for controlling the operation of said transmitting means in accordance with the directions of energy flow at said points, blocking means at each of said points connected to be controlled by said transmitted currents for preventing the directional responsive means at each point from effecting the energization of the associated auxiliary circuit, means for continuing under asynchronous conditions of said alternating current circuit the preventive action of said blocking means for a predetermined time after the directional means at one point ceases to effect the operation of the transmitting means at said point, and means for rendering said continuing means ineffective to continue said preventive action on the occurrence of a fault on said alternating current circuit between said points causing unbalance between the phases of the circuit during asynchronous conditions thereof.

4. In combination, an alternating current circuit, means for transmitting a control current from each of two points of said circuit to the other, an auxiliary circuit at each of said points, directional fault responsive means at each of said points for energizing the auxiliary circuits at the respective points on the occurrence of predetermined conditions of said alternating current circuit and for controlling the operation of said transmitting means in accordance with the directions of energy flow at said points, blocking means at each of said points connected to be controlled by said transmitted currents for preventing the directional responsive means at each point from effecting the energization of the associated auxiliary circuit, and means for continuing under asynchronous conditions of said alternating current circuit the transmission of current by the transmitting means at either of said points for a predetermined time after the directional means at the point ceases to effect the operation of the transmitting means at the point whereby to continue the preventive action of said blocking means.

5. In combination, an alternating current circuit, means for transmitting a current from each of two points of said circuit to the other, an auxiliary circuit at each of said points, directional fault responsive means at each of said points for energizing the auxiliary circuits at the respective points on the occurrence of predetermined conditions of said alternating current circuit and for controlling the operation of said transmitting means in accordance with the directions of energy flow at said points, blocking means at each of said points connected to be controlled by said transmitted currents for preventing the directional responsive means at each point from effecting the energization of the associated auxiliary circuit, means for continuing under asynchronous conditions of said alternating current circuit the transmission of current by the transmitting means at either of said points for a predetermined time after the directional means at the point ceases to effect the operation of the transmitting means at the point whereby to continue the preventive action of said blocking means, and means for rendering said continuing means ineffective to continue said transmission on the occurrence of a fault on said alternating current circuit between said points causing unbalance between the phases of the circuit during asynchronous conditions thereof.

6. In combination, an alternating current circuit, means for transmitting a control current from each of two points of said circuit to the other, an auxiliary circuit at each of said points, directional fault responsive means at each of said points for controlling the energization of the auxiliary circuits at the respective points on the occurrence of predetermined conditions of said alternating current circuit and for controlling the operation of said transmitting means in accordance with the directions of energy flow at said points, blocking means at each of said points connected to be controlled by said transmitted currents for preventing the directional fault responsive means at each point from effecting the energization of the associated auxiliary circuit, means for continuing the preventive action of said blocking means throughout that part of a slip cycle of said alternating current circuit which under asynchronous conditions presents the appearance of a fault between said two points including an instantaneous pick-up time delay drop-out relay at each of said points; and means at each of said points for effecting the energization of said relay in response to a predetermined direction of power flow at the point during abnormal current conditions affecting all phases of said alternating current circuit.

7. In combination, an alternating current circuit, means for transmitting a control current from each of two points of said circuit to the other, an auxiliary circuit at each of said points, directional fault responsive means at each of said points for controlling the energization of the auxiliary circuits at the respective points on the occurrence of predetermined conditions of said alternating current circuit and for controlling the operation of said transmitting means in accordance with the directions of energy flow at said points, blocking means at each of said points connected to be controlled by said transmitted currents for preventing the directional fault responsive means at each point from effecting the energization of the associated auxiliary circuit, means for continuing the preventive action of said blocking means throughout that part of a slip cycle of said alternating current circuit which under asynchronous conditions presents the appearance of a fault between said two points, and means for rendering said continuing means ineffective to continue said preventive action on the occurrence of a fault on said alternating current circuit between said points causing unbalance between the phases of the circuit during asynchronous conditions thereof.

8. In combination, an alternating current circuit, means for transmitting a control current from each of two points of said circuit to the other, an auxiliary circuit at each of said points, fault responsive means at each of said points for controlling the energization of the auxiliary circuits at the respective points on the occurrence of predetermined circuit conditions and for controlling the operation of said transmitting means in accordance with the directions of energy flow at said points, blocking means at each of said points connected to be controlled by said transmitted currents for preventing the fault responsive means at each point from effecting the energization of the associated auxiliary circuit, and means for continuing under asynchronous conditions of said alternating current circuit the operation of the transmitting means at one point after the fault responsive means at said point ceases to effect operation of said transmitting means and until the operation of the transmitting means at the other point is effected by the fault responsive means at said other point.

9. In combination, an alternating current circuit, means for transmitting a control current from each of two points of said circuit to the other, an auxiliary circuit at each of said points, fault responsive means at each of said points for controlling the energization of the auxiliary circuits at the respective points on the occurrence of predetermined circuit conditions and for controlling the operation of said transmitting means in accordance with the directions of energy flow at said points, blocking means at each of said points connected to be controlled by said transmitted currents for preventing the fault responsive means at each point from effecting the energization of the associated auxiliary circuit, means for continuing under asynchronous conditions of said alternating current circuit the operation of the transmitting means at one point after the fault responsive means at said point ceases to effect operation of said transmitting means and until the operation of the transmitting means at the other point is effected by the directional responsive means at said other point, and means for rendering said continuing means ineffective to continue said preventive action on the occurrence of a fault on said alternating current circuit between said points causing unbalance between the phases of the circuit during asynchronous conditions thereof.

10. In combination, a polyphase alternating current circuit, an auxiliary circuit, fault responsive means for controlling the energization of said auxiliary circuit on the occurrence of predetermined conditions of said alternating curren circuit, blocking means for preventing said fault responsive means from effecting the energization of said auxiliary circuit, means responsive to predetermined conditions of said alternating current circuit for effecting the operation of said blocking means while said predetermined conditions exist and for a time interval thereafter sufficient to prevent the energization of said auxiliary circuit by said fault responsive means during asynchronous conditions of said alternating current circuit, and means for rendering the means responsive to said predetermined conditions ineffective to continue said preventive action on the occurrence of all fault conditions of said alternating current circuit except balanced polyphase fault conditions.

11. In combination, an alternating current circuit, an auxiliary circuit, fault responsive means for controlling the energization of said auxiliary circuit in accordance with the direction of energy flow at one point in the alternating current circuit, blocking means for preventing said fault responsive means from effecting the energization of said auxiliary circuit, means responsive to the direction of energy flow at another point of said alternating current circuit for controlling the operation of said blocking means, means for preventing an effective control of said auxiliary circuit throughout that part of a slip cycle of said alternating current circuit, which under asynchronous conditions presents the appearance of a fault between said points, and means for eliminating the preventive action of said slip cycle preventive means on the occurrence of a fault on said alternating current circuit between said points causing unbalance between the phases of the circuit during asynchronous conditions thereof.

12. Protective equipment for a line-section of a polyphase alternating current transmission line, comprising an auxiliary circuit and relaying means therefor at each end of the line-section, each of said relaying means including relaying means directionally responsive to certain faults, a communicating channel between the two ends of the line-section, auxiliary means associated with said communicating channel for selectively cooperating with the directionally responsive means at the ends of the line-section so as to respond to conditions of internal faults between the two ends of the line-section for energizing the auxiliary circuits at the ends of the line-section, and means responsive to the occurrence of a certain predetermined fault current condition without energization of said auxiliary circuits for thereafter preventing such energization for a predetermined time only in response to an indication of a balanced internal polyphase fault without ground current.

13. In combination, a polyphase alternating current circuit, means for transmitting a control current from each of two points of said circuit to the other, an auxiliary circuit at each of said points, directional fault responsive means at each of said points for effectively controlling the auxiliary circuits at the respective points on the occurrence of predetermined conditions of said alternating current circuit and for controlling the operation of said transmitting means in accordance with the directions of energy flow at said points, means at each of said points connected to be controlled by said transmitted currents for preventing the directional fault responsive means at each point from effectively controlling the associated auxiliary circuit, means for preventing an effective control of said auxiliary circuit throughout that part of a slip cycle of said alternating current circuit which under asynchronous conditions presents the appearance of a fault between said two points, and means for eliminating the preventive action of said slip cycle preventive means on the occurrence of all faults on said alternating current circuit between said points causing unbalance between the phases of the circuit during asynchronous conditions thereof.

14. In combination, an alternating current circuit, means for interrupting the circuit at each of two points thereof, normally inactive means for transmitting a control current from each of said points to the other, directional fault responsive means at said points connected to be energized from the circuit for controlling the circuit of the associated circuit interrupting means and for effecting the operation of said transmitting means under predetermined directions of energy flow at said points, means at each of said points connected to be controlled by said transmitted currents for preventing the directional fault responsive means at each point from controlling the opening of the associated circuit interrupting means, normally deenergized instantaneous opening time delay closing relay operative upon energization to prevent the opening of said circuit interrupting means, and means responsive to asynchronous conditions of said alternating current circuit presenting the appearance of a fault external to the portion of said alternating current between said two points for effecting the energization of said relay.

15. In combination, an alternating current circuit, means for interrupting the circuit at each of two points thereof, normally inactive means for transmitting a control current from each of said points to the other, directional fault responsive means at said points connected to be energized from the circuit for controlling the circuit of the associated circuit interrupting means and for effecting the operation of said transmitting means under predetermined directions of energy flow at said points, means at each of said points connected to be controlled by said transmitted currents for preventing the directional fault responsive means at each point from controlling the opening of the associated circuit interrupting means, means comprising an instantaneous opening time delay closing relay operative upon energization to prevent the opening of said circuit interrupting means throughout that part of a slip cycle of said alternating current circuit which under asynchronous conditions presents the appearance of a fault between said two points, means for controlling the energization of said relay, and relay means having contacts in parallel with the contacts of said slip cycle relay for eliminating the preventive action thereof on the occurrence of a fault on said alternating current circuit between said points causing unbalance between the phases of the circuits during asynchronous conditions thereof.

16. In a polyphase circuit, a circuit interrupter in said circuit, means responsive to a balanced polyphase fault on one side of said interrupter for effecting the immediate opening of said interrupter, means for preventing a balanced polyphase fault on said one side of said interrupter from effecting the immediate opening of said interrupter when said balanced polyphase fault occurs within a predetermined time after the occurrence of another predetermined type of fault on said circuit, and means responsive to an unbalanced phase fault on said one side of said interrupter for effecting the immediate opening of said interrupter at any time.

17. In a polyphase circuit, a circuit interrupter in said circuit, means responsive to a balanced polyphase fault on one side of said interrupter for effecting the immediate opening of said interrupter, means for preventing a balanced polyphase fault on said one side of said interrupter from effecting the immediate opening of said interrupter when said balanced polyphase fault occurs within a predetermined time after the occurrence of a balanced polyphase fault on the other side of said circuit interrupter, and means responsive to an unbalanced phase fault on said one side of said interrupter for effecting the immediate opening of said interrupter at any time.

18. In a polyphase circuit, a circuit interrupter in said circuit, a control circuit, means responsive to the energization of said control circuit for controlling the opening of said circuit interrupter, two sets of normally closed parallel contacts in said control circuit, means responsive to a balanced polyphase fault on either side of said circuit interrupter for opening one of said sets of contacts, means responsive to a balanced polyphase fault on only one side of said circuit breaker for opening the other of said sets of contacts, and means for delaying the closing of said other of said sets of contacts after the termination of the balanced polyphase fault which effected the opening thereof.

19. In a polyphase circuit, a circuit interrupter in said circuit, a control circuit, means responsive to the energization of said control circuit for controlling the opening of said circuit interrupter, contacts in said control circuit, means responsive to a balanced polyphase fault on one side of said circuit interrupter for maintaining said contacts open for a predetermined time after the termination of said predetermined balanced polyphase fault, a shunt circuit around said contacts, and means for opening said shunt circuit during predetermined fault conditions on the other side of said circuit interrupter.

ELBERT H. BANCKER.
THERON A. CRAMER.